United States Patent
Chen

(10) Patent No.: US 7,369,319 B2
(45) Date of Patent: May 6, 2008

(54) OPTICAL SYSTEM FOR TELESCOPE

(75) Inventor: Hui-Qing Chen, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/326,304

(22) Filed: Jan. 4, 2006

(65) Prior Publication Data

US 2006/0221468 A1  Oct. 5, 2006

(30) Foreign Application Priority Data

Apr. 1, 2005  (TW) .............................. 94110653 A

(51) Int. Cl.
*G02B 25/00* (2006.01)
*G02B 9/34* (2006.01)

(52) U.S. Cl. ...................... 359/644; 359/771; 359/773

(58) Field of Classification Search ........ 359/643–646, 359/771, 773
See application file for complete search history.

(56) References Cited

U.S. PATENT DOCUMENTS

| 4,286,844 | A | * | 9/1981 | Nagler | 359/644 |
| 4,389,097 | A | * | 6/1983 | Ohishi | 359/644 |
| 5,162,945 | A | * | 11/1992 | Matsuo et al. | 359/646 |
| 6,424,468 | B1 | * | 7/2002 | Mouri et al. | 359/645 |

FOREIGN PATENT DOCUMENTS

JP  54011754 A  *  1/1979

* cited by examiner

*Primary Examiner*—Scott J. Sugarman

(57) ABSTRACT

An optical system (1) of telescope includes an objective lens (10) for collecting incident light and transmitting the incident light along a light path, and an imaging lens group (20) disposed on the light path that makes the optical system focus on an image plane (40). The imaging lens group includes two positive lenses and two negative lenses. Each lens of the imaging lens group has a refractive index less than 1.80.

23 Claims, 2 Drawing Sheets

OPTICAL SYSTEM FOR TELESCOPE

BACKGROUND OF THE INVENTION

1. Field of the Invention

The present invention generally relates to an optical system of telescope, and more particularly to an optical system having high field brightness.

2. Description of the Prior Art

FIG. 1 of the attached drawings shows a conventional optical system 9 of telescope. The conventional optical system 9 comprises an objective lens 90 that collects incident light and transmits the incident light along a light path, a prism 91 disposed on the light path for refracting and converging the light beam in order to reduce the whole optical length of the optical system 9, an imaging lens group 92 disposed on the light path for adjusting the focus and determining an image plane 94 of the optical system 9, and two pieces of flat glass 93 disposed in front of the image plane 94. The imaging lens group 92 comprises four lenses, which are respectively first, second, third, and fourth lenses 95-98. The first lens 95 is a positive lens, the second lens 96 is a negative lens, the third lens 97 is a positive lens, and the fourth lens 98 is a positive lens. However, the conventional optical system 9 has a problem on field brightness, which can be clearly observed from the test chart shown in FIG. 2. The brightness at a circumferential edge is much lower than that at the center area. The plot shown in FIG. 2 indicates that the relative brightness is only 36% at the radius of 3 mm. The edge brightness is very low, which makes the edge of the field of view obscure or even dark.

Additionally, the first through fourth lenses 95-98 are all made of glass whose refractive indices are all higher than 1.80, as shown in the following table:

| Lens | Type of Glass | Refractive Index (Nd) | Abbe coefficient (Vd) |
| --- | --- | --- | --- |
| First lens 95 | S-LAH53 | 1.8061 | 40.90 |
| Second lens 96 | S-NPH1 | 1.8081 | 22.80 |
| Third lens 97 | S-LAH65 | 1.8040 | 46.60 |
| Fourth lens 98 | S-LAH65 | 1.8040 | 46.60 |

For a glass lens, generally, the higher the refractive index is, the lower the rigidity is. Therefore, the lenses 95-98 having high refractive indexes are difficult to process. Furthermore, the cost of the conventional optical system 9 is high for using such glass lenses having high refractive indexes.

Hence, an improved optical system is desired to overcome the above-mentioned disadvantages of the prior art.

SUMMARY OF THE INVENTION

An objective, therefore, of the present invention is to provide an optical system of telescope having low cost and high field brightness.

In order to achieve the above objective and overcome the above-identified deficiencies in the prior art, an optical system of telescope in accordance with the present invention comprises an objective lens that collects incident light and transmits the incident light along a light path, and an imaging lens group disposed on the light path for making the optical system focus on an image plane. The imaging lens group comprises a first lens, a second lens, a third lens, and a fourth lens. The first lens is a thin positive lens. The second lens is a thin negative lens. The third lens is a thick positive lens. The fourth lens is a thin negative lens. The refractive indexes of these lenses are all between 1.62 and 1.76.

Other objects, advantages, and novel features of the invention will become more apparent from the following detailed description of a preferred embodiment when taken in conjunction with the accompanying drawings.

BRIEF DESCRIPTION OF THE DRAWINGS

The present invention may best be understood through the following description with reference to the accompanying drawings, in which.

DETAILED DESCRIPTION OF THE PREFERRED EMBODIMENT

Reference will now be made in detail to preferred embodiments of the present invention.

Figure 3:
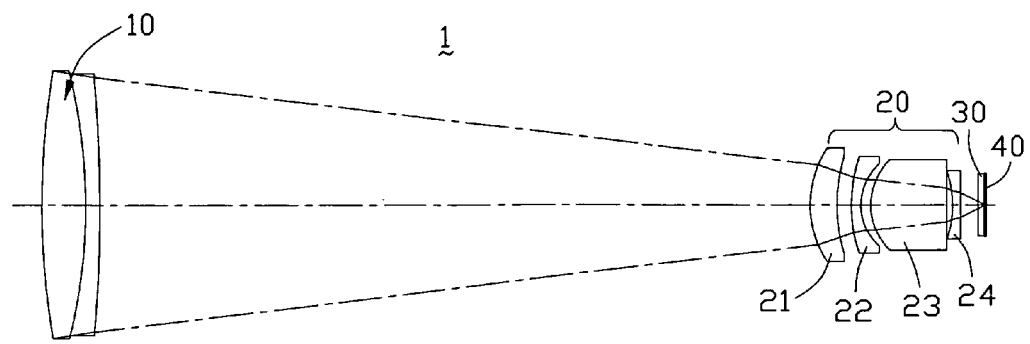
FIG. 3 is a schematic view of an optical system of telescope in accordance with the present invention.

Referring to FIG. 3, an optical system of telescope in accordance with the present invention, generally designated with reference numeral 1, comprises an objective lens 10 that collects incident light and transmits the incident light along a light path, an imaging lens group 20 that adjusts the focus of the optical system 1 and determines an image plane 40 of the optical system 1 at a distance corresponding to the focus. In order to obtain a better image, a piece of flat glass 30 having a special optical effect can be disposed in front of the image plane 40 according to an embodiment of the present invention. The special optical effect can be achieved by coating a film, such as an anti-reflection film, or an infrared filtering film, on the flat glass 30. In order to reduce the whole optical length of the optical system 1, a prism, which is similar to the one disclosed in FIG. 1, can be disposed between the objective lens 10 and the imaging lens group 20.

The imaging lens group 20 comprises four lenses, which are respectively a first lens 21, a second lens 22, a third lens 23 and a fourth lens 24. The first lens 21 is a thin positive lens, the second lens 22 is a thin negative lens, the third lens 23 is a thick positive lens, and the fourth lens 24 is a thin negative lens. The third lens 23 is provided for correcting aberration. The first, second, third, and fourth lenses 21-24 are all made of glass whose refractive indices are between 1.62 and 1.76. In an embodiment, the lenses 21-24 can be selected as follows:

| Lens | Type of Glass | Refractive Index (Nd) | Abbe coefficient (Vd) |
| --- | --- | --- | --- |
| First lens 21 | LAK2 | 1.6921 | 54.54 |
| Second lens 22 | S-TIH4 | 1.7552 | 27.50 |
| Third lens 23 | LAK2 | 1.6921 | 54.54 |
| Fourth lens 24 | S-BSM16 | 1.6204 | 60.30 |

Figure 1:
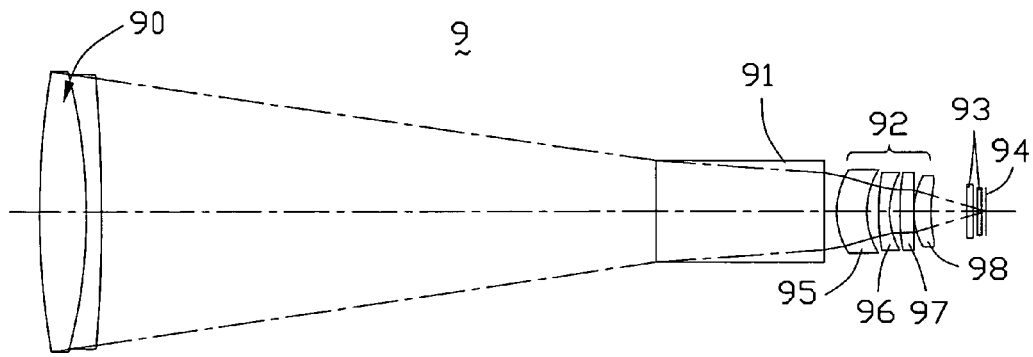
FIG. 1 is a schematic view of a conventional optical system of telescope.
Figure 2:
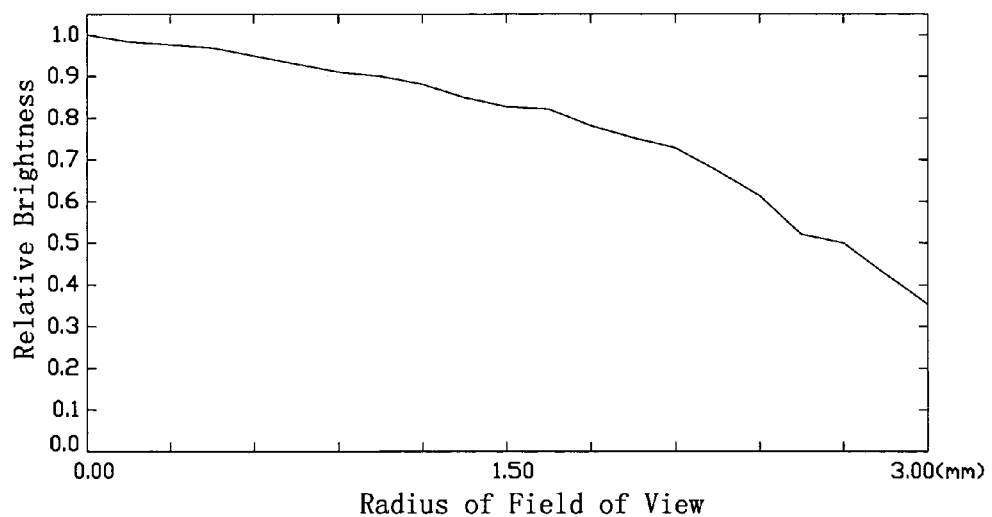
FIG. 2 is a test chart recording of relative brightness as a function of radius of the field of view of the conventional optical system of FIG. 1.

It can be seen from the above table that, the lenses 21-24 of the optic system of the present invention each has a refractive index lower than the corresponding lenses 95-98 of the conventional optic system as shown in FIG. 1. It is easy to process the first through fourth lenses 21-24 and the costs of the image lens group 20 are reduced. Additionally, the first through fourth lenses 21-24 are designed with appropriate thickness and shapes, and work cooperatively within a lower refractive index range, thereby ensuring an excellent image quality of the optical system 1 of the present invention.

Figure 4:
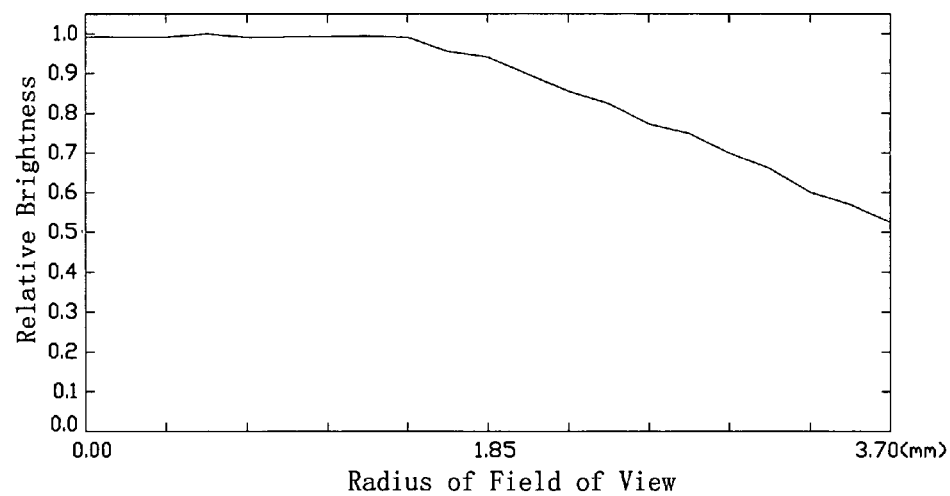
FIG. 4 is a test chart recording of relative brightness as a function of radius of the field of view of the optical system of the present invention.

FIG. 4 shows a test chart recording of relative brightness as a function of radius of the field of view of the optical system 1. It is observed from the chart of FIG. 4 that the relative brightness of edge brightness to center brightness reaches 52% at the radius of 3.7 mm. The field of view of the optical system 1 gets wider, and the relative brightness of the optical system 1 is higher, which can satisfy general requirements of users.

It is to be understood, however, that even though numerous characteristics and advantages of the present invention have been set forth in the foregoing description, together with details of the structure and function of the invention, the disclosure is illustrative only, and changes may be made in detail, especially in matters of material, plating method and manufacturing process within the principles of the invention to the full extent indicated by the broad general meaning of the terms in which the appended claims are expressed.

What is claimed is:

1. An optical system of telescope comprising an objective lens and an imaging lens group defining an optical axis with the objective lens, the imaging lens group adjusting the focus of the optical system and consisting of a first single lens, a second single lens, a third single lens and a fourth single lens, two of the single lenses being positive lenses and the other two being negative lenses, the refractive index of each single lens of the imaging lens group being between 1.62 and 1.76, the second and fourth single lenses being meniscus lenses each having its surface of greatest curvature adjacent the third single lens.

2. The optical system as claimed in claim 1, wherein at least one lens of the imaging lens group is a thick lens.

3. The optical system as claimed in claim 2, wherein the other lenses of the imaging lens group are all thin lenses.

4. The optical system as claimed in claim 2, wherein the thick lens is disposed between the negative lenses.

5. The optical system as claimed in claim 1, wherein the third lens is a thick positive lens, and the fourth lens is a thin negative lens.

6. The optical system as claimed in claim 1, wherein the refractive index of the first lens is 1.6921.

7. The optical system as claimed in claim 6, wherein the refractive index of the second lens is 1.7552.

8. The optical system as claimed in claim 7, wherein the refractive index of the third lens is 1.6921.

9. The optical system as claimed in claim 8, wherein the refractive index of the fourth lens is 1.6204.

10. The optical system as claimed in claim 1, wherein all the lenses of the imaging lens group are made of glass.

11. The optical system as claimed in claim 1, wherein the first and third single lenses have the same refractive index.

12. The optical system as claimed in claim 1, wherein, among the four single lenses, the second single lens has the greatest refractive index, and the fourth single lens has the smallest refractive index.

13. An optical system of telescope comprising:
    an objective lens collecting incident light and transmitting the incident light along a light path; and
    first, second, third, and fourth lenses disposed on the light path in order, and cooperatively making the optical system focus on an image plane;
    wherein the first lens is a single positive lens, the second lens is a single negative lens, the third lens is a single positive lens, and the fourth lens is a single negative lens, and wherein the refractive indexes of the four single lenses are all between 1.62 and 1.76.

14. The optical system as claimed in claim 13, wherein the refractive index of the first lens is 1.6921.

15. The optical system as claimed in claim 14, wherein the refractive index of the second lens is 1.7552.

16. The optical system as claimed in claim 15, wherein the refractive index of the third lens is 1.6921.

17. The optical system as claimed in claim 16, wherein the refractive index of the fourth lens is 1.6204.

18. The optical system as claimed in claim 13, wherein the first and third single lenses have the same refractive index.

19. The optical system as claimed in claim 13, wherein, among the four single lenses, the second single lens has the greatest refractive index, and the fourth single lens has the smallest refractive index.

20. The optical system as claimed in claim 13, wherein the second and fourth single lenses are meniscus lenses each having its surface of greatest curvature adjacent the third single lens.

21. The optical system as claimed in claim 13, further comprising a piece of flat glass disposed between the fourth lens and an image plane.

22. The optical system as claimed in claim 21, wherein the flat glass is plated with an optical film.

23. The optical system as claimed in claim 21, further comprising a prism disposed between the objective lens and the first lens for reducing the whole length of the optical system.

* * * * *